US006966341B2

(12) United States Patent
Heer

(10) Patent No.: US 6,966,341 B2
(45) Date of Patent: Nov. 22, 2005

(54) COMPRESSED AIR CONTROL APPARATUS FOR COMPRESSED AIR SYSTEMS OF MOTOR VEHICLES

(75) Inventor: Siegfried Heer, Wiesloch (DE)

(73) Assignee: Haldex Brake Products GmbH, Heidelberg (DE)

(*) Notice: Subject to any disclaimer, the term of this patent is extended or adjusted under 35 U.S.C. 154(b) by 350 days.

(21) Appl. No.: 10/435,443

(22) Filed: May 9, 2003

(65) Prior Publication Data
US 2003/0209268 A1 Nov. 13, 2003

(30) Foreign Application Priority Data
May 10, 2002 (DE) ............... 102 20 789

(51) Int. Cl.[7] ............................................. F16K 11/10
(52) U.S. Cl. ....................... 137/885; 303/119.3
(58) Field of Search ............... 137/883, 885; 303/60, 119.1, 119.3

(56) References Cited

U.S. PATENT DOCUMENTS 3,977,734 A * 8/1976 Ronnhult et al. ......... 303/119.3
5,678,900 A   10/1997 Blanz ......................... 303/6.01
6,540,308 B1   4/2003 Hilberer ..................... 303/6.01

FOREIGN PATENT DOCUMENTS

| DE | 44 21 575 C2 | 1/1996 |
| DE | 195 15 895 A1 | 10/1996 |
| DE | 195 44 621 C1 | 1/1997 |
| DE | 196 49 498 C1 | 2/1998 |
| DE | 197 00 243 C1 | 4/1998 |
| EP | 0 689 117 B1 | 12/1995 |
| EP | 0 776 807 B1 | 6/1997 |
| WO | WO 00/07863 | 2/2000 |

* cited by examiner

Primary Examiner—John Fox
(74) Attorney, Agent, or Firm—Thomas, Kayden, Horstemeyer & Risley, LLP

(57) ABSTRACT

A compressed air control apparatus for compressed air systems of motor vehicles includes a pressure controller (10) for controlling the pressure, an air dryer (6) for drying the compressed air flowing through the compressed air control apparatus and a multi circuit protection valve (9) for supplying a plurality of circuits (I, II, III, IV, V) with compressed air. The multi circuit protection valve (9) includes at least one solenoid valve (35) including a deaerating connection (15) leading to the atmosphere and a plurality of overflow valves (18). Each of the overflow valves (18) is associated with one of the circuits (I, II, III, IV or V). The overflow valves (18) include a valve body (20), a flow chamber (23), a rear chamber (34), a first effective surface (22), a second effective surface (27), a third effective surface (33) and a spring (31) being located in the rear chamber (34). The valve body (20) separates the flow chamber (23) from the rear chamber (34). The valve body (20) has a first side facing the flow chamber (23) and a second side facing away from the flow chamber (23). The overflow valve (18) has an opening pressure being greater than its closing pressure to allow for limited backflow. The first effective surface is directly impinged with pressure by the solenoid valve. The third effective surface (33) is arranged either at the first side to be directly impinged with pressure or at the second side to be indirectly impinged with pressure.

20 Claims, 5 Drawing Sheets

COMPRESSED AIR CONTROL APPARATUS FOR COMPRESSED AIR SYSTEMS OF MOTOR VEHICLES

CROSS REFERENCE TO RELATED APPLICATIONS

This application claims priority to co-pending German Patent Application No. 102 20 789.5 entitled "Druckluftaufbereitungseinrichtung für Kfz-Druckluftanlagen", filed May 10, 2002.

FIELD OF THE INVENTION

The present invention generally relates to a compressed air control apparatus for compressed air systems of motor vehicles. Usually, such compressed air control apparatuses include a pressure controller, an air dryer and a multi circuit protection valve. These elements usually form one common structural unit. Such a structural unit is arranged downstream of the compressor of a compressed air supply apparatus of the vehicle.

BACKGROUND OF THE INVENTION

A compressed air control apparatus is known from German Patent No. DE 195 44 621 C1 corresponding to European Patent No. EP 0 776 807 B1. A pressure controller and an air dryer including respective elements are located in a common housing. The common housing may also be designed to be divided. The known compressed air control apparatus includes a multi circuit protection valve being designed and arranged to serve for a plurality of circuits being connected to the housing. Each circuit includes an overflow valve having limited backflow. For this purpose, each overflow valve includes a valve body or a so called "movable wall" being supported on a spring at one side. An effective surface is located at the other side. The effective surface is subjected or impinged by a compressed air in a flow chamber being located at the upstream side. The flow chamber is permanently connected to a central bore serving for distribution of the arriving compressed air. The valve body of the overflow valve includes two effective surfaces facing the upstream side, namely the aforementioned first effective surface and a second effective surface. The second effective surface is active in the opened position, and it is subjected with compressed air in the opened position, respectively. The valve body is supported on a spring being surrounded by a spring chamber. A bypass conduit is located between the flow chamber and the spring chamber. A solenoid valve including its own deaerating connection is located in the bypass conduit. The solenoid valve is closed in its currentless condition such that the spring chamber of the overflow valve is connected to the atmosphere. When the solenoid valve is actively controlled, it switches to reach its other position. This means that the deaerating connection is locked and the spring chamber is connected to the flow chamber such that there is an additional force or auxiliary force in addition to the force supplied by the spring. The auxiliary force tends to close the overflow valve and to keep the overflow valve closed, respectively. In this way, the overflow valve fulfills a plurality of functions. When the rear chamber is connected to the atmosphere, it functions in the common way, meaning it provides the advantageous functions of an overflow valve having limited backflow. When the rear chamber is supplied with the same pressure as the control chamber at the other side of the valve body, the force of the spring in the rear chamber closes the overflow valve. This means that it also fulfills the function of the locking valve. In this way, it is possible to lock the respective circuit, especially in case of a failure. This has a positive effect on the other unlocked circuits, meaning emergency operation may also be maintained for these circuits during a failure. Furthermore, the multi circuit protection valve and the respective overflow valve may also be used for the purpose of limiting the pressure. It is a drawback that the known overflow valve having limited backflow cannot be opened before having reached the opening pressure. Another essential drawback of the known compressed air control apparatus is the fact that there is increased pressure in this circuit having limited pressure during failure of the electrical supply or when ignition of the vehicle is turned off when using different pressures in the circuits and using an overflow valve as the pressure limiting device. This increased pressure is forbidden by law.

Another similar compressed air control apparatus is known from German Patent No. DE 197 00 243 C1. The effective surface to be directly subjected by the solenoid valve is located at the side of the valve body facing away from the flow chamber and, thus, at the side of the spring. A special pressure limiting valve is used for the following circuits. The pressure limiting valve is arranged downstream of the respective overflow valve of the respective circuit. In this case, the overflow valve is only used to fulfill its normal pneumatic function. The pressure limiting valve may be additionally influenced by the solenoid valve. However, it is not possible to open the overflow valve below the predetermined opening pressure in an arbitrary way, meaning when it is desired. The actuation of the solenoid valve results in the pressure limiting function of the pressure limiting device being turned off.

Another compressed air control apparatus is known from German Patent No. DE 44 21 575 C2 corresponding to European Patent No. EP 0 689 117 B1. The known apparatus includes a pressure controller, an air dryer and a multi circuit protection valve. The circuits are protected by check valves being pushed open by an actuation piston to be switched by a solenoid valve. The circuits may also be protected by an overflow valve including limited backflow. A solenoid valve is associated with each of the overflow valves of each circuit. The solenoid valve in its non-excited condition is opened, meaning the spring chamber of the overflow valve is connected to the flow chamber. In this way, the overflow valve has a comparatively increased opening pressure. In the excited position, the solenoid valve switches, and it deaerates the spring chamber. The effective surface to be subjected by the solenoid valve is located at the side of the movable wall facing away from the flow chamber, meaning in the spring chamber. This results in the insofar increased effective surface of the spring chamber having the effect of the overflow valve not opening when filling. This is only possible when the solenoid valve switches to reach the position in which the spring chamber is connected to the atmosphere. In this way, there is the drawback of supply of the circuits not being possible during a failure of the electric supply. On the other hand, when the electric supply works correctly, it is not possible to open the overflow valve of a circuit before having reached the predetermined opening pressure of the overflow valve.

SUMMARY OF THE INVENTION

The present invention relates to a compressed air control apparatus for compressed air systems of motor vehicles.

Especially, the motor vehicles are trucks. The compressed air control apparatus includes a pressure controller for controlling the pressure, an air dryer for drying the compressed air flowing through the compressed air control apparatus and a multi circuit protection valve for supplying a plurality of circuits with compressed air. The multi circuit protection valve includes at least one solenoid valve including a deaerating connection leading to the atmosphere and a plurality of overflow valves. Each of the overflow valves is associated with one of the circuits. The overflow valves include a valve body, a flow chamber, a rear chamber, a first effective surface, a second effective surface, a third effective surface and a spring being located in the rear chamber. The valve body separates the flow chamber from the rear chamber. The valve body has a first side facing the flow chamber and a second side facing away from the flow chamber. The overflow valve has an opening pressure being greater than its closing pressure to allow for limited backflow. The third effective surface is directly impinged with pressure by the solenoid valve. The third effective surface is arranged either at the first side to be directly impinged with pressure or at the second side to be indirectly impinged with pressure.

With the novel compressed air control apparatus, it is possible to open the overflow valve of at least one circuit below its opening pressure in an arbitrary way, meaning when it is desired for achieving a special function. When the overflow valve is opened, compressed air can stream into the reservoir container of the respective circuit.

The present invention is based on the concept of increasing the opening possibilities of the overflow valves of the circuits. For example, some of the circuits may be filled below the opening pressure of the respective overflow valve in a very simple way. The safety function of the overflow valve is used in a known way. This means that the overflow valve has a closing pressure below the opening pressure when stopping direct or indirect subjection of the overflow valve.

Generally, there are two different ways of designing the novel compressed air control apparatus. The first possibility is to directly subject an effective surface being located at the solenoid valve. The second possibility is to indirectly subject an effective surface being located at the solenoid valve. Direct subjection is to be understood as being related to a solenoid valve being designed and arranged to connect the effective surface to the atmosphere in the currentless condition. This means that the effective surface is deaerated in the currentless condition of the solenoid valve. In the excited position of the solenoid valve, the effective surface is impinged with compressed air. Indirect subjection is to be understood as being related to a solenoid valve being designed and arranged to aerate the effective surface in the currentless condition of the solenoid valve. The effective surface is connected to the atmosphere in the excited condition of the solenoid valve. This means that the effective surface is deaerated in the excited position of the solenoid valve. In association with these two different design possibilities of the novel apparatus, the effective surface is located at the front side of the valve body facing the flow chamber or at the rear side of the valve body.

When compressed air is consumed in a certain circuit of the apparatus, the pressure decreases. When the pressure drops below the closing pressure of the overflow valve, the respective circuit is locked and protected in this way. With the novel apparatus, it is possible to allow for an exchange of air between the circuits even below the closing pressure of the overflow valve by respectively controlling the solenoid valves by an electronic control unit. In this way, it is especially possible to refill a brake circuit being associated with the brake system of the trailer of a truck, for example.

There are a number of possibilities of designing the overflow valve and the associated solenoid valve. The solenoid valve includes its own deaerating connection, and it may be designed and arranged in a way that the deaerating opening is locked in its excited position and such that it connects the flow chamber with the effective chamber being associated with the effective surface. In the non-excited condition, the effective chamber being associated with the effective surface is connected to the atmosphere, while the connection to the flow chamber of the overflow valve is locked. This also means that the overflow valve fulfills its normal pneumatic function during a failure of the electric supply. It is to be understood that in such a case it is not possible to open the overflow valve below its opening pressure.

The valve body and the overflow valve, respectively, further includes a first effective surface and a second effective surface. The first effective surface is located at the first side of the valve body, and it is designed and arranged to be permanently impinged with upstream pressure, meaning pressure coming from the upstream direction of the central bore. The second effective surface is also located at the first side of the valve body, and it is designed and arranged to be permanently impinged with downstream pressure. These effective surfaces are partial effective surfaces being located at one side of the valve body, meaning at the side facing away from the spring chamber. It is to be understood that these partial surfaces are protected with respect to one another in a respective way. When the opening pressure of the overflow valve is reached, the first and the second effective surface are interconnected such that the passage from the central bore of the compressed air control apparatus into the reservoir containers of the respective circuit is ensured.

There is another possibility of indirectly subjecting or releasing the third effective surface of the valve body of the overflow valve. In this case, the solenoid is designed and arranged to keep the deaerating connection in an opened position and to lock the bypass conduit being designed and arranged to bypass the valve body in an excited position of the solenoid valve such that the third effective surface being arranged at the first side is not impinged with pressure. The effective surface being located at the side facing the flow chamber is not relieved by deaerating the effective chamber. In such an embodiment, the valve body—which may be designed as a step piston or as a membrane piston—includes partial effective surfaces at both sides. These partial effective surfaces are interconnected by a bypass conduit such that there will be pressure compensation in the non-excited position of the solenoid valve. In this way, the pressure from the central bore will only affect the normal partial effective surface of the movable wall of the overflow valve. When the solenoid valve is switched to reach the other position, the bypass conduit is interrupted, and the effective surface facing the spring chamber is connected to the atmosphere such that a previously effective force is no longer present. Thus, the force affecting the side facing the flow chamber now has the effect of opening the overflow valve.

The valve body may have various designs. A preferred design is the design of a step piston. The piston is made of stiff material, especially of metal. It includes a number of steps and respective seals.

Another possibility is to design the valve body as a membrane piston. In this case, the valve body is made of elastic material having resilient properties to a certain limited extent. The membrane piston may be clamped at the rim, meaning at the housing, or it may include respective movement lips to fulfill a movement at this place, and to allow for a movement, respectively.

It is also possible to arrange a pressure limiting device downstream of the overflow valve and a connecting conduit. The pressure limiting device includes a piston having an actuation surface, an actuation chamber being associated with the actuation surface and a limiting spring being designed and arranged to support the piston in an opening direction. The actuation chamber is connected to the effective chamber of the third effective surface of the overflow valve by the connecting conduit. This means that the solenoid valve is not only associated with the overflow valve, but also with the pressure limiting device. When switching the solenoid valve, this has an effect on the overflow valve as well as on the pressure limiting device. The overflow valve and the pressure limiting device are simultaneously opened such that the reservoir container of the respective circuit may be filled. There are a number of possibilities of designing the pressure control device.

Common association of the solenoid valve with the overflow valve and a pressure limiting device of a respective circuit is also possible when realizing the indirectly subjected effective surface at the overflow valve. In such a case, a pressure limiting device is located downstream of the overflow valve having limited backflow. The pressure limiting device includes a piston being supported on a limiting spring in the opening direction. The pressure limiting device at the side facing away from the limiting spring includes a relieve surface. The actuation chamber of the relieve surface is connected to the effective chamber of the effective surface of the overflow valve via a connecting conduit. In this way, when the solenoid valve is excited, the effective surface as well as the discharge chamber of the pressure limiting device are connected to the atmosphere such that both valves may be opened. It is also possible to invert the order of arrangement of the overflow valve and of the pressure limiting device. This means that the pressure limiting device is arranged upstream of the overflow valve as seen in the flow direction of the pressure medium.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
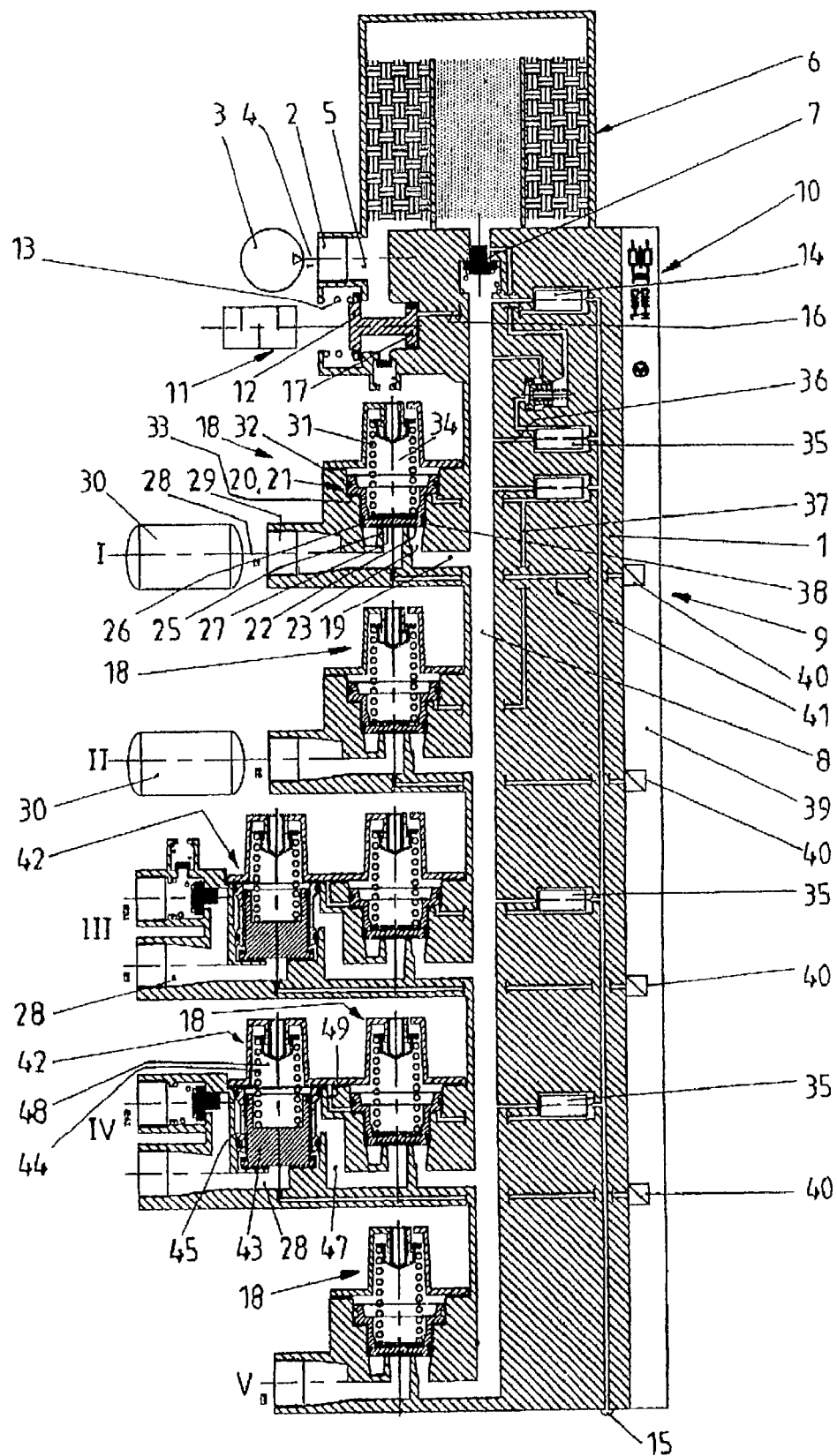
FIG. 1 is a schematic sectional view of the novel compressed air control apparatus.

Referring now in greater detail to the drawings, FIG. 1 illustrates a novel compressed air control apparatus for compressed air systems of motor vehicles. Especially, the motor vehicles are trucks. The illustrated compressed air control apparatus includes a common housing 1. Most of the components of the compressed air control apparatus are located in the housing 1 and they are connected to the housing 1, respectively. The housing 1 includes a connection 2 to which a connection conduit 4 coming from a compressor 3 is connected. The connection 2 leads to a distributing chamber 5 from which the compressed air streams through an air dryer 6 to reach a check valve 7. When the check valve 7 is pushed open, the compressed air reaches a central bore 8 to which a plurality of circuits are connected. In this way, the function of an integrated multi circuit protection valve 9 serving to supply a plurality of circuits with compressed air is realized. A pressure controller 10 is located in the housing 1. In this case, the pressure controller 10 is designed as an electrical pressure controller 10. The pressure controller 10 includes an outlet valve 11 including a piston 12 and a closing spring 13. The piston 12 is supported on the closing spring 13. A solenoid valve 14 is associated with the outlet valve 11. The solenoid valve 14 is supplied with compressed air from the central bore 8. It includes its own deaerating (or ventilating) connection 15 leading to the atmosphere. Compressed air may reach an actuating piston 17 via the solenoid valve 14 and a conduit 16 to open the outlet valve 11.

The compressed air control apparatus includes circuits I, II, III, IV and V. Each circuit I, II, III, IV and V includes an overflow valve 18. The overflow valve 18 has limited backflow. This means that the opening pressure is greater than the closing pressure of the overflow valve 18. The overflow valve 18it is connected to the central bore 8 by a conduit 19 to be supplied with compressed air. The overflow valve 18 includes a valve body 20 (a so called "movable wall"). In the illustrated exemplary embodiment, the valve body 20 is designed as a step piston 21. The valve body 20 and the step piston 21, respectively, includes a first effective surface 22 being located at the upstream side. A flow chamber 23 is located close to the effective surface 22, the flow chamber 23 being permanently connected to the central bore 8 by the conduit 19. The valve body 20 and the step piston 21, respectively, surface includes a sealing plate 24 (FIG. 2) being located at its front. The sealing plate 24 and a rim 25 are designed and arranged to cooperate to form a passage valve 24, 25. The step piston 21 includes a seal 26 being designed and arranged to limit the effective surface 22 being located between the seal 26 and the rim 25 in the form of an (outer) annulus.

The step piston 21 includes a second effective surface 27 being designed as an (inner) circular surface being surrounded by the rim 25. The second effective surface 27 is permanently subjected with pressure from the downstream side. This means that a conduit 28 leads from the effective surface 27 to a reservoir container 30 via a conduit 29. The reservoir container 30 is associated with the circuit I. The rear side of the step piston 21 facing away from the flow chamber 23 is supported on a spring 31. The spring 31 is supported at the housing 1, and it may be designed to be adjustable by a spring plate including adjustment screws, for example. The opening pressure of the overflow valve 18—meaning the pressure at which the passage valve 24, 25 opens—is determined by the force of the spring 31 in combination with the size of the first effective surface 22.

The step piston 21 and the valve body 20, respectively, includes another seal 32 being formed at a stepped portion of the step piston 21, the stepped portion having an increased diameter. A third effective surface 33 is located between the seals 26 and 32. The third effective surface 33 is also located at the side of the step piston 21 facing the flow chamber 23. The spring 31 is arranged in a rear chamber 34 being permanently connected to the atmosphere to prevent pressure from building up in the rear chamber 34.

A solenoid valve 35 is associated with the overflow valve 18. The solenoid valve 35 includes its own deaerating connection 15. In this exemplary case, the deaerating connection 15 is constructively combined with the deaerating connection 15 of the solenoid valve 14. A conduit 36 is connected to the entrance of the solenoid valve 35. The solenoid valve 35 is supplied with compressed air from the central bore 8 by the conduit 36. A control conduit 37 is connected to the solenoid valve 35. The control conduit 37 leads to an effective chamber 38 of the overflow valve 18. The third effective surface 33 of the step piston 21 is associated with the effective chamber 38. A control unit 39 is located inside or outside of the housing 1. The solenoid valve 35 and the other solenoid valves are electrically controlled by the control unit 39.

Each of the circuits I, II, III, IV and V includes such an overflow valve 18 having limited backflow as described above. The two overflow valves 18 of the circuits I and II are associated with one common solenoid valve 35. The circuit III includes another solenoid valve 35, as well as the circuit IV. The circuit V does not include such a solenoid valve 35. Pressure tension converters 40 are associated with the circuits. The pressure tension converters 40 are connected to the respective reservoir containers 30 of the associated circuit by conduits 41. The pressure tension converters 40 may be arranged in the region of the electronic control unit 39.

As it may be seen in FIG. 1, the circuits III and IV may be divided to form sub-circuits. Such a sub-circuit may include an additional check valve.

An overflow valve 18 having limited backflow is arranged in each of the respective conduits 28 leading from the central bore 8 to the respective reservoir container 30 of the circuits I and II. An overflow valve 18 is also arranged in the conduit 28 of the circuit V, but the circuit V does not include a reservoir container.

Figure 2:
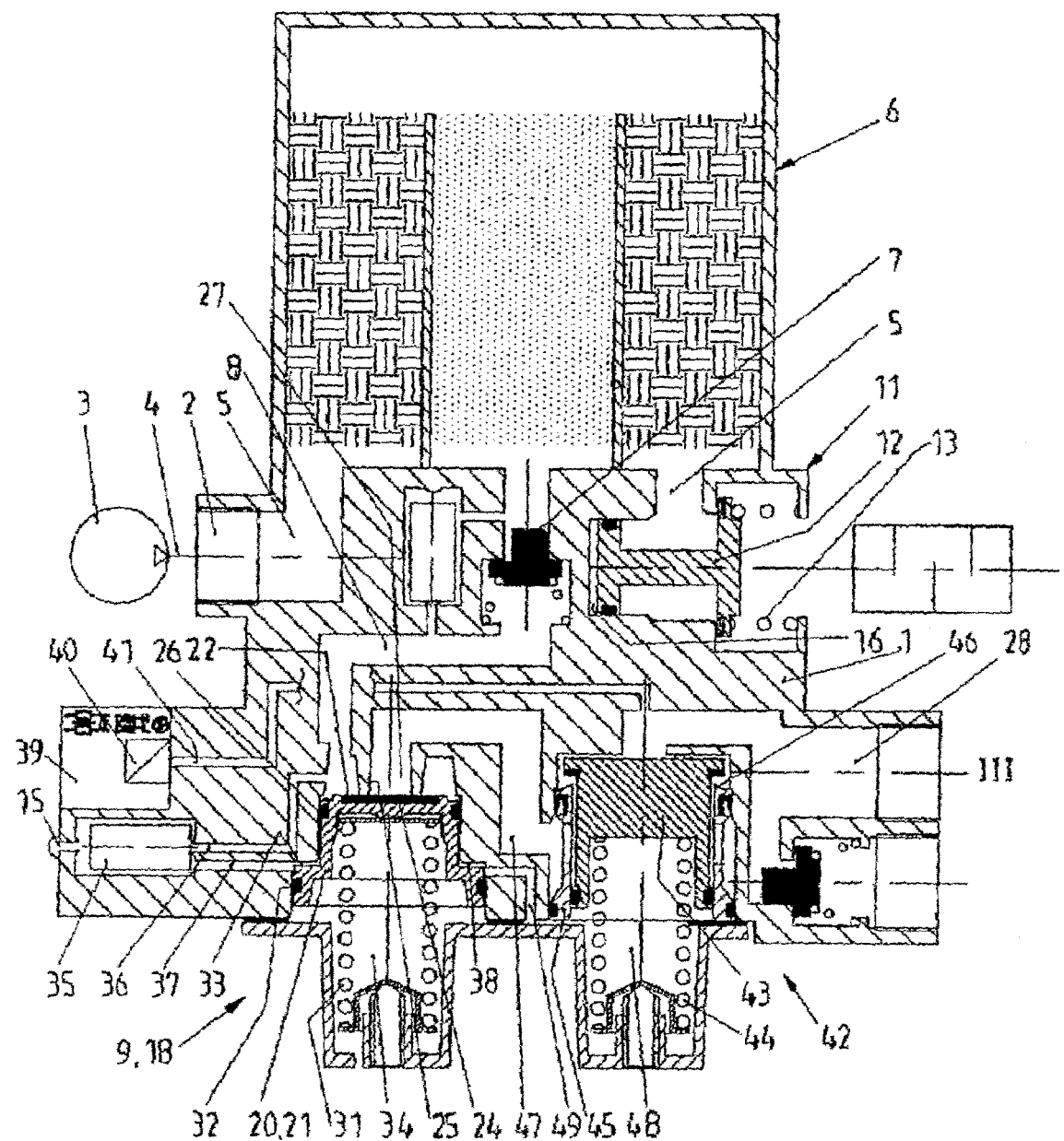
FIG. 2 is a detailed view of some parts of the novel compressed air control apparatus being associated with a circuit.

A pressure limiting device 42 is located downstream of the overflow valves 18 of the circuits III and IV. The pressure limiting device 42 includes a piston 43 being supported on a limiting spring 44. The force of the limiting spring 44 may be designed to be adjustable. The piston 43 of the pressure limiting device 42 is surrounded by an insert 45 being supported at the housing 1 (FIG. 2). The insert 45 is arranged in a sealed way. The piston 43 and a rim 46 of the insert body 45 form a passage valve for compressed air being delivered by the overflow valve 18 via a conduit 47. The conduit 28 leads from the pressure limiting device 42 to the respective reservoir container 30 of the respective circuit (not illustrated). The limiting spring 44 is arranged in an actuation chamber 48. The actuation chamber 48 is connected to the effective chamber 38 of the third effective surface 33 of the respective overflow valve 18 via a connection conduit 49. In this way, a switching movement of the solenoid valve 35 in the circuits III and IV also has an effect on the respective pressure limiting device 42 being located downstream of the overflow valve 18.

FIG. 2 illustrates a preferred constructive design of the overflow valve 18 having limited backflow and of the pressure limiting device 42 at an enlarged scale and relating to the example of the circuit III. It is easily imaginable that the overflow valve 18 may also be associated with another one of the circuits. It is also imaginable that the order of arrangement of the overflow valve 18 and of the pressure limiting device 42 could also be inverted.

Figure 3:
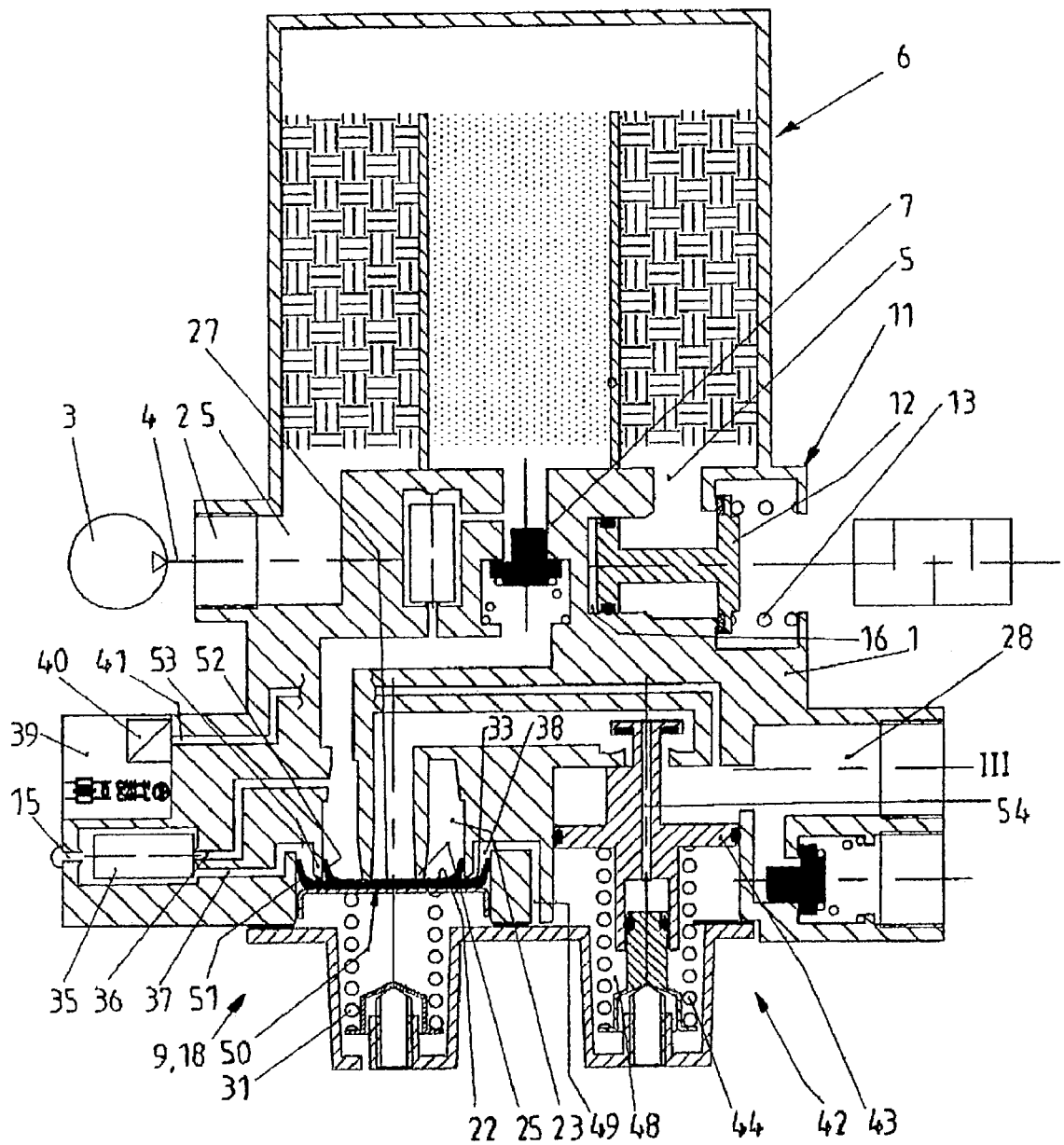
FIG. 3 is a detailed view of some parts of another embodiment of the novel compressed air control apparatus.

FIG. 3 illustrates another constructive exemplary embodiment of the overflow valve 18 having limited backflow. The overflow valve 18 includes a membrane piston 50 instead of a step piston. The membrane piston 50 is supported on a spring 31. The membrane piston 50 is made of elastic material. It includes a seal lip 51 being located at its edge. A seal lip 52 is located at a smaller diameter. The seal lip 52 with a rim 53 fulfills a sealing function such that the third effect surface 33 is realized between the seal lip 51 and the lip 52. The effective surface 33 is controlled by a solenoid valve 35. The rim 53 serves to separate the first effective surface from the second effective surface. The three effective surfaces 22, 27 and 33 are arranged at the upstream side of the membrane piston 50 facing the flow chamber 23. The function of this overflow valve 18 having limited backflow generally is identical to the function of the other illustrated and described exemplary embodiments of FIGS. 1 and 2.

FIG. 3 also illustrates another exemplary embodiment of the pressure limiting device 42. The pressure limiting device 42 includes a piston 43 being supported on a limiting spring 44. The piston 43 is designed to be free from pressure, and it includes a bore 54 by which the surfaces having the same size and being located at both sides are subjected by the same pressure. The actuation chamber 48 is connected to the effective chamber 38 of the third effective surface 33 by the connecting conduit 49. In this way, the piston 43 of the pressure limiting device 42 may be subjected in the opening sense such that the solenoid valve 35 switches.

Figure 4:
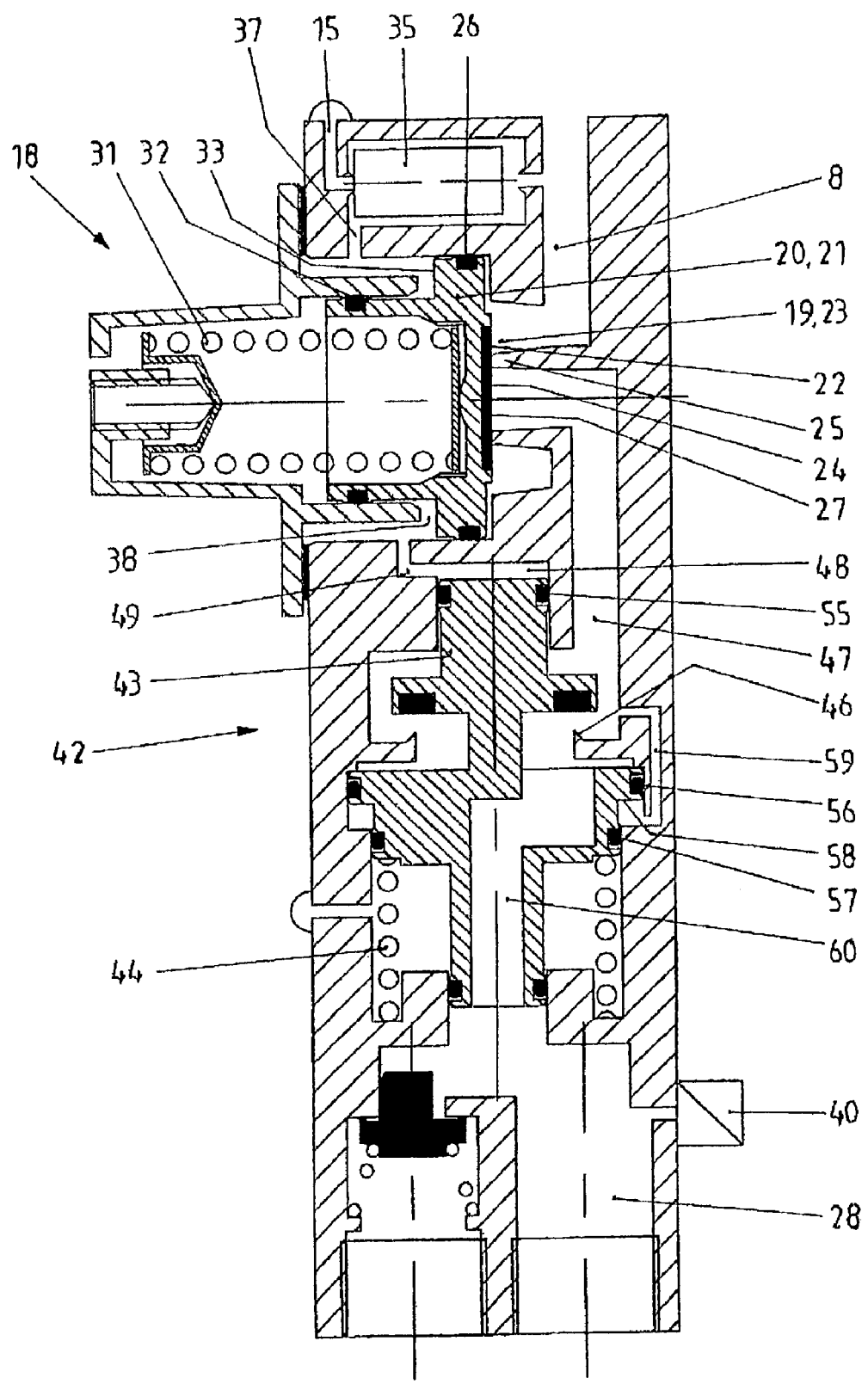
FIG. 4 is a view of another exemplary embodiment of the overflow valve and the pressure controller of the novel apparatus.

FIG. 4 illustrates another exemplary embodiment of the overflow valve 18 and of the pressure limiting device 42 in combination with a solenoid valve 35 being designed to be opened in the currentless condition. The solenoid valve 35 includes its own deaerating connection 15. The overflow valve 18 is supplied with compressed air by the conduit 8 and the conduit 19. The movable valve body 20 is designed as a step piston 21. The first effective surface 22 is arranged at the upstream side and between a rim 25 and a seal 26. The flow chamber 23 is also located at this place. The valve body 20 also includes the seal plate 24 forming the second effective surface together with the rim 25. The step piston 21 is supported on an adjustable spring 31. The step piston 21 includes another seal 32 being located on a smaller diameter than the seal 26. A third effective surface 33 is located between the seals 26 and 32, the third effective surface 33 being located at the rear side of the step piston 21. The effective surface 33 is smaller than the effective surface 22. A control conduit 37 leads from the solenoid valve 35 to the third effective surface 33 and to the effective chamber 38, respectively. The connecting conduit 49 leads from the effective chamber 38 to the pressure limiting device 42. The pressure limiting device 42 includes a piston 43 being supported on the limiting spring 44. The actuation chamber 48 of the piston 43 is located at the other side. The respective effective surface is determined by a seal 55. The piston 43 together with a rim 46 forms a passage valve to which the conduit 47 coming from the overflow valve 18 is connected. At the rear side of the piston 43, seals 56 and 57 determine an effective surface having the same dimensions as the effective surface being determined by the seal 55. A bypass conduit 59 is the connection to the conduit 47. A channel 60 extends through the piston 43 and leads to the conduit 28 of the respective circuit and to another circuit via a check valve.

The operation of the apparatus including the overflow valve 18 and the pressure limiting device 42 (which may be associated with any of the consumer circuits) is as follows:

The solenoid valve 35 is located in its opened position in the currentless condition, as this is illustrated in FIG. 4. Consequently, compressed air being delivered by the compressor increases the pressure in the central bore 8 and acting upon the first effective surface 22. At the same time, the compressed air reaches the third effective surface 33. The valve body 20 is opened in response to the difference of the values of the effective surfaces 22 and 33 such that compressed air coming from the central bore 8 may stream into the conduit 47 of the pressure limiting device 42. The piston 43 of the pressure limiting device 42 may be chosen such that its passage valve with the rim 46 is located in the opened position despite of the effect of the pressure in the actuating chamber 48. As soon as the pressure in the conduit 47 increases after having opened the overflow valve 18, the compressed air reaches the conduit 28 of the respective circuit. At the same time, the effective surface being enclosed by the seal 26 is subjected to pressure such that there will be a closing position against the force of the limiting spring 44 when the pressure increases. In this way, the pressure in the conduit 28 and the respective circuit is correspondingly limited.

When switching the solenoid valve 35 into the closed position, the effective chamber 38 and the actuating chamber 48 will be deaerated. The overflow valve 18 remains in the opened position. Due to the fact that there is no subjection by pressure in the actuation chamber 48, the piston 43 is moved in an upward direction such that it opens its passage valve with the rim 46. In this way, there is the possibility of building up increased pressure in the conduit 28, meaning to eliminate the pressure limit of the pressure limiting device 42. Similar applies to the following streaming of compressed air when compressed air is consumed in the respective circuit.

When the pressure in the central bore 8 is less than the closing pressure of the overflow valve 18 for some reason, the overflow 18 reaches its closing position. The effective surface 33 may be deaerated by switching the solenoid valve 35 into the closing position. Thus, the overflow valve 18 may be opened. In this way, there is the possibility to feed compressed air into the respective circuit by a switching operation.

Figure 5:
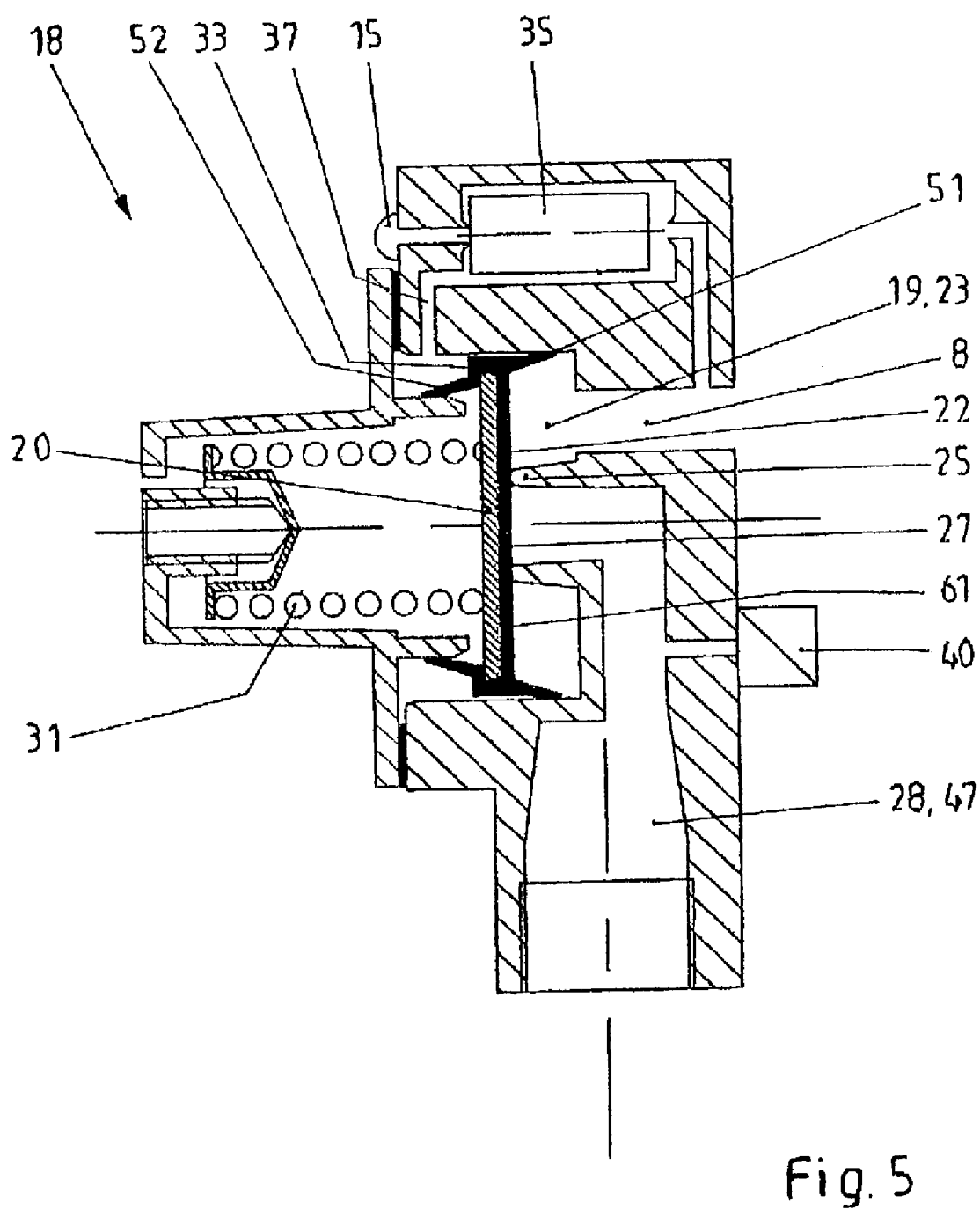
FIG. 5 is a view of another exemplary embodiment of the overflow valve without a pressure controller.

FIG. 5 illustrates another exemplary embodiment of the overflow valve 18. In this case, there is a solenoid valve 35 being opened in its currentless condition, as also to be seen in FIG. 4. The overflow valve 18 is designed as a membrane valve. A leathering 61 surrounds a stiff body being supported on the spring 31. The leathering 61 with its outer rim forms the seal lip 51. The first effective surface 22 is determined between the seal lip 51 and the rim 25. The rim 25 encloses a second effective surface 27. A lip 52 is located at the rear side of the leathering 61. The third effective surface 33 is formed between the seal lip 51 and the lip 52. The conduit 28 is connected to the overflow valve 18 when no pressure limiting device is prearranged. In the other case, this is the conduit 47 (FIG. 4).

The overflow valve 18 according to FIG. 5 has the same functionality as the overflow valve 18 according to FIG. 4.

Many variations and modifications may be made to the preferred embodiments of the invention without departing substantially from the spirit and principles of the invention. All such modifications and variations are intended to be included herein within the scope of the present invention, as defined by the following claims.

I claim:

1. A compressed air control apparatus for compressed air systems of motor vehicles, comprising:
   a pressure controller being designed and arranged to control the pressure in said compressed air control apparatus;
   an air dryer being designed and arranged to dry the compressed air flowing through said compressed air control apparatus; and
   a multi circuit protection valve being designed and arranged to supply a plurality of circuits with compressed air, said multi circuit protection valve including:
      at least one solenoid valve including a deaerating connection leading to the atmosphere, and
      a plurality of overflow valves, each of said overflow valves being associated with one of said circuits,
         said overflow valve including a valve body, a flow chamber, a rear chamber, a first effective surface, a second effective surface, a third effective surface and a spring being located in said rear chamber, said valve body being designed and arranged to separate said flow chamber from said rear chamber, said valve body having a first side facing said flow chamber and a second side facing away from said flow chamber,
         said overflow valve being designed and arranged in a way that its opening pressure is greater than its closing pressure to allow for limited backflow,
         said third effective surface being designed and arranged to be directly impinged with pressure by said solenoid valve,
         said third effective surface being arranged at one of said first side to be directly impinged with pressure and said second side to be indirectly impinged with pressure.

2. The compressed air control apparatus of claim 1, wherein said overflow valve further includes an effective chamber being associated with said third effective surface, said solenoid valve being designed and arranged in a way that it locks said deaerating connection and it connects said flow chamber with said effective chamber in an excited position of said solenoid valve.

3. The compressed air control apparatus of claim 2, wherein:
   said first effective surface is located at said first side of said valve body and is designed and arranged to be permanently impinged with upstream pressure, and
   said second effective surface is located at said first side of said valve body and is designed and arranged to be permanently impinged with downstream pressure.

4. The compressed air control apparatus of claim 1, further comprising a bypass conduit being designed and arranged to bypass said valve body,
   said third effective surface being arranged at said first side to be directly impinged with pressure,
   said solenoid valve being designed and arranged to keep said deaerating connection in an opened position and to lock said bypass conduit in an excited position of said solenoid valve such that said third effective surface is not impinged with pressure.

5. The compressed air control apparatus of claim 3, wherein said valve body is designed as a step piston.

6. The compressed air control apparatus of claim 4, wherein said valve body is designed as a step piston.

7. The compressed air control apparatus of claim 3, wherein said valve body is designed as a membrane piston.

8. The compressed air control apparatus of claim 4, wherein said valve body is designed as a membrane piston.

9. The compressed air control apparatus of claim 3, further comprising a pressure limiting device being arranged downstream of said overflow valve and a connecting conduit, said pressure limiting device including a piston having an actuation surface, an actuation chamber being associated with said actuation surface and a limiting spring being designed and arranged to support said piston in an opening direction, said actuation chamber being connected to said effective chamber of said third effective surface of said overflow valve by said connecting conduit.

10. The compressed air control apparatus of claim 9, further comprising a first conduit and a second conduit, said piston of said pressure limiting device including a lip element being designed and arranged to allow for backflow of compressed air from said first conduit to said second conduit.

11. The compressed air control apparatus of claim 4, further comprising a connecting conduit and a pressure limiting device being arranged downstream of said overflow valve, said pressure limiting device including a piston having a relief surface, an actuation chamber being associated with said relief surface and a limiting spring being designed and arranged to support said piston in an opening direction, said actuation chamber being connected to said effective chamber of said third effective surface of said overflow valve by said connecting conduit.

12. The compressed air control apparatus of claim 11, wherein said piston of said pressure limiting device includes a seal.

13. The compressed air control apparatus of claim 11, further comprising a first conduit and a second conduit, said piston of said pressure limiting device including a lip element being designed and arranged to allow for backflow of compressed air from said first conduit to said second conduit.

14. A compressed air control apparatus for compressed air systems of motor vehicles, comprising:
a multi circuit protection valve being designed and arranged to supply a plurality of circuits with compressed air, said multi circuit protection valve including:
at least one solenoid valve including a deaerating connection leading to the atmosphere, and
a plurality of overflow valves, each of said overflow valves being associated with one of said circuits,
at least one of said overflow valves including a valve body, a flow chamber, a rear chamber, a first effective surface, a second effective surface, a third effective surface and a spring being located in said rear chamber,
said valve body being designed and arranged to separate said flow chamber from said rear chamber,
said valve body having a first side facing said flow chamber and a second side facing away from said flow chamber,
said first effective surface being located at said first side of said valve body and being designed and arranged to be permanently impinged with upstream pressure,
said second effective surface being located at said first side of said valve body and being designed and arranged to be permanently impinged with downstream pressure,
said third effective surface being designed and arranged to be directly impinged with pressure by said solenoid valve,
said third effective surface being arranged at one of said first side to be directly impinged with pressure acting against the force of said spring and said second side to be indirectly impinged with pressure in the direction of the force of said spring.

15. The compressed air control apparatus of claim 14, wherein said overflow valve further includes an effective chamber being associated with third first effective surface, said solenoid valve being designed and arranged in a way that it locks said deaerating connection and it connects said flow chamber with said effective chamber in an excited position of said solenoid valve.

16. The compressed air control apparatus of claim 14, further comprising a bypass conduit being designed and arranged to bypass said valve body,
said third effective surface being arranged at said first side to be directly impinged with pressure,
said solenoid valve being designed and arranged to keep said deaerating connection in an opened position and to lock said bypass conduit in an excited position of said solenoid valve such that said third effective surface is not impinged with pressure.

17. The compressed air control apparatus of claim 14, wherein said valve body is designed as a step piston.

18. The compressed air control apparatus of claim 15, wherein said valve body is designed as a step piston.

19. The compressed air control apparatus of claim 14, wherein said valve body is designed as a membrane piston.

20. The compressed air control apparatus of claim 15, wherein said valve body is designed as a membrane piston.

* * * * *